United States Patent
Lee et al.

(10) Patent No.: US 7,693,384 B2
(45) Date of Patent: Apr. 6, 2010

(54) WAVEGUIDE STRUCTURE

(75) Inventors: Jong-Moo Lee, Daejeon (KR); Duk-Jun Kim, Daejeon (KR); O-Kyun Kwon, Daejeon (KR); Gyung-Ock Kim, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 12/111,884

(22) Filed: Apr. 29, 2008

(65) Prior Publication Data

US 2009/0148115 A1 Jun. 11, 2009

(30) Foreign Application Priority Data

Dec. 10, 2007 (KR) .................. 10-2007-0127813

(51) Int. Cl.
*G02B 6/10* (2006.01)
(52) U.S. Cl. ..................... 385/132; 385/129
(58) Field of Classification Search .............. None
See application file for complete search history.

(56) References Cited

U.S. PATENT DOCUMENTS

| 2006/0133720 | A1 | 6/2006 | Hochberg et al. |
| 2006/0228074 | A1 | 10/2006 | Lipson et al. |
| 2007/0114628 | A1 | 5/2007 | Barrios et al. |

FOREIGN PATENT DOCUMENTS

| JP | 63-281104 A | 11/1988 |
| KR | 1020000021963 A | 4/2000 |
| KR | 1020060014528 A | 2/2006 |

OTHER PUBLICATIONS

J. Lee et al. Controlling temperature dependence of silicon waveguide using slot structure. Optics Express, 16:3:1645-1652, Feb. 2008.*
Vilson R. Almeida et al., "Guiding and confining light in void nanostructure", Optics Letters, vol. 29, No. 11, pp. 1209-1211, Jun. 2004.
Tom Baehr-Jones et al., "High-Q optical resonators in silicon-on-insulator-based slot waveguides", Applied Physics Letters, vol. 86, 081101, pp. 081101-1~3, Feb. 2005.
T. Baehr-Jones et al., "Optical modulation and detection in slotted Silicon waveguides", Optics Express, vol. 13, No. 14, pp. 5216-5226, Jul. 2005.
Jong-Moo Lee et al., "Temperature Dependence of Silicon Nanophotonic Ring Resonator With a Polymeric Overlayer", J. Lightwave Technology, vol. 25, No. 8, pp. 2236-2243, Aug. 2007.

* cited by examiner

*Primary Examiner*—Mike Stahl

(57) ABSTRACT

A waveguide structure is provided. The waveguide structure includes: a slot channel waveguide including first and second patterns, which are spaced apart from each other to define a slot; a first upper layer covering at least a portion of the slot channel waveguide; and a second upper layer covering the remaining portion of the slot channel waveguide. A thermo-optic coefficient (TOC) of the channel waveguide times a TOC of the second upper layer is a negative number.

20 Claims, 10 Drawing Sheets

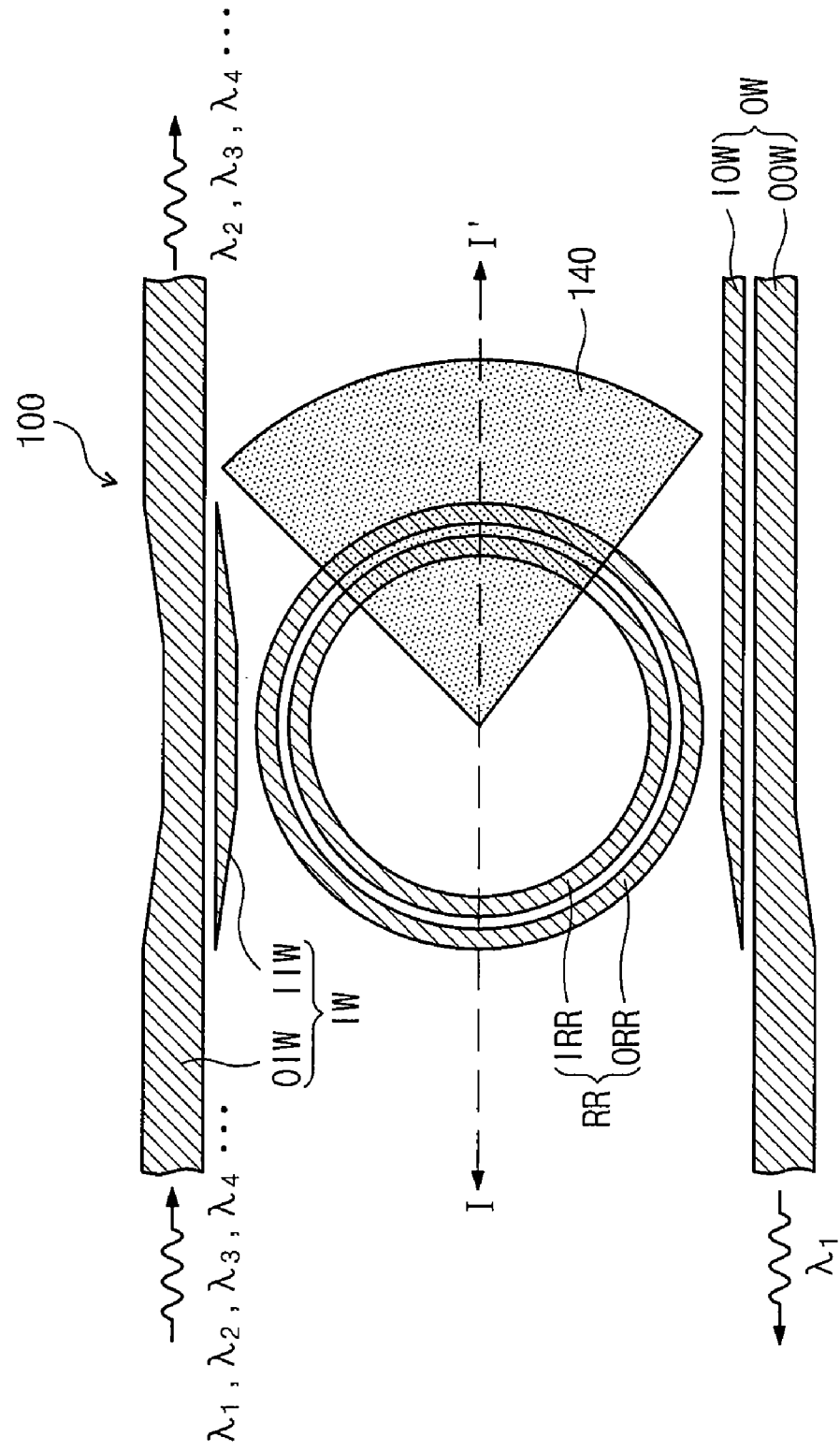

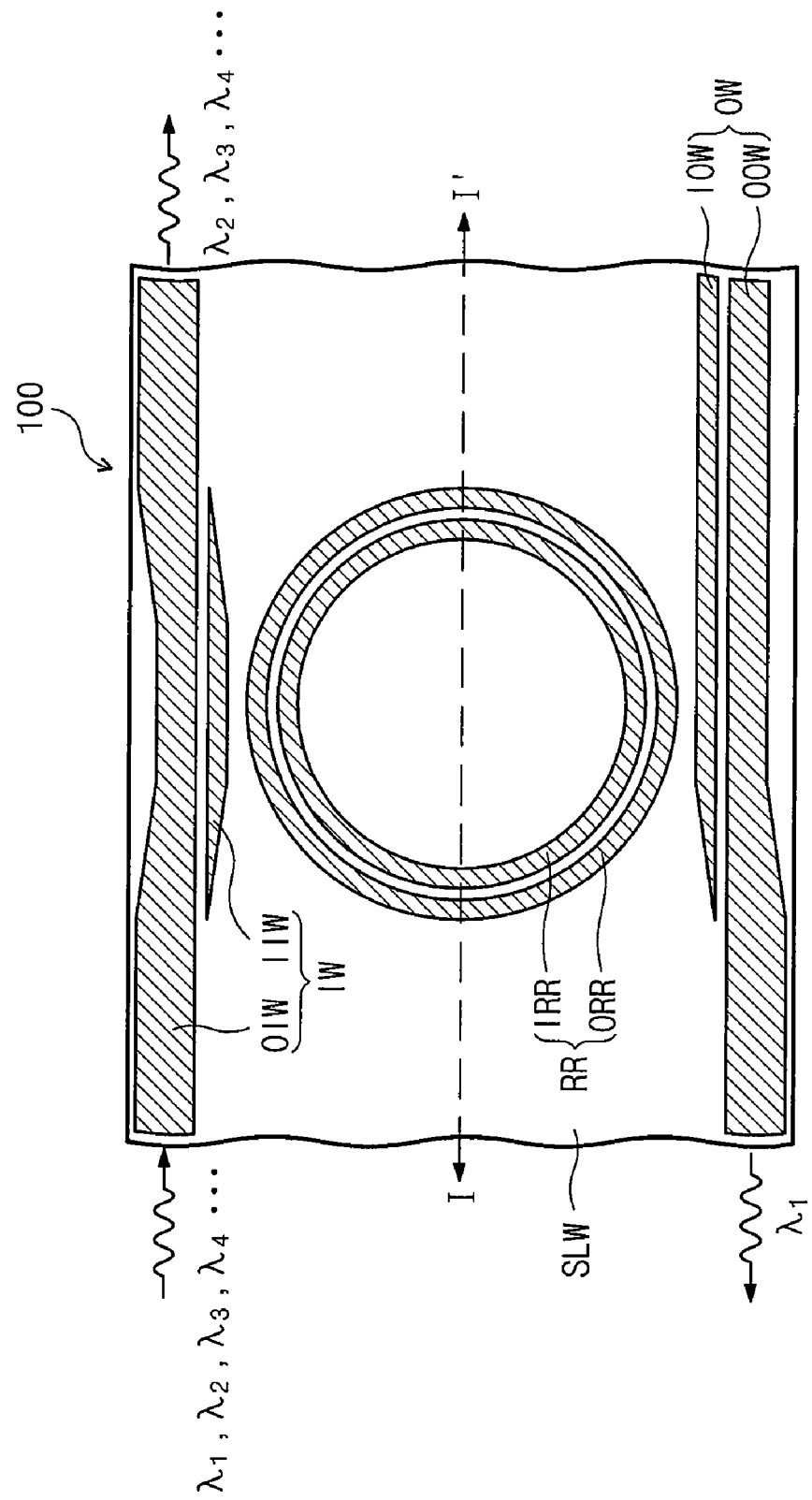

WAVEGUIDE STRUCTURE

CROSS-REFERENCE TO RELATED APPLICATIONS

This U.S. non-provisional patent application claims priority under 35 U.S.C. § 119 of Korean Patent Application No. 10-2007-127813, filed on Dec. 10, 2007, the entire contents of which are hereby incorporated by reference.

BACKGROUND OF THE INVENTION

The present invention disclosed herein relates to a photonic device, and more particularly, to a waveguide structure capable of reducing temperature-dependent wavelength shift (TDWS).

The present invention has been derived from research undertaken as a part of the information technology (IT) development business by the Ministry of Information and Communication and the Institute for Information Technology Advancement of the Republic of Korea [Project management No.: 2006-S-004-02, Project title: silicon based ultra high speed optical interconnection IC].

Optical interconnection technology can be used to realize a high speed bus of a semiconductor device such as a central processing unit (CPU). A wavelength-division-multiplexing (WDM) device capable of selectively dividing a predetermined wavelength of light is required to exchange signals through the optical interconnection technology.

Because a ring resonator can selectively extract light with a predetermined wavelength by the use of optical resonance phenomenon, it can be used for a WDM device. For example, a method of selectively extracting light with a predetermined wavelength is disclosed in a paper by W. Bogaerts et al. ("Compact Wavelength-Selective Functions in Silicon-on-Insulator Photonic Wires," IEEE J. Selected Topics in Quantum Electronics, vol. 12, no. 6, 2006.). In more detail, as illustrated in FIG. 1, this paper of W. Bogaerts discloses a method of minutely adjusting radii of rings 11, 12, 13, and 14 to selectively extract lights with various wavelengths $\lambda_1$, $\lambda_2$, $\lambda_3$ and $\lambda_4$ (that is, $r_1 < r_2 < r_3 < r_4$).

However, silicon has a thermo-optic coefficient (TOC) of 0.00018/° C., which is about 18 times that of silica ($SiO_2$). Herein, the TOC represents a change in refractive index with temperature. Accordingly, a silicon ring resonator has a TDWS ranging from about 80 pm/° C. to about 100 pm/° C., which may not be appropriate for an actual product.

To reduce such a high TWDS, a method of forming a channel waveguide using silica or polymer for a cladding may be considered. This method is effective in a silica WDM device, whereas it is not available for a WDM device based on silicon having a high TOC because this method cannot effectively suppress the TDWS in the silicon WDM device. Especially, most of an optical mode is distributed inside a silicon core in a channel waveguide structure of a silicon WDM device, and thus a method of forming a cladding of polymer may not effectively control the TDWS because only a portion of the optical mode is distributed in the cladding.

Furthermore, methods for suppressing TDWS for transverse magnetic (TM) mode was suggested before, but any method for effectively suppressing the TDWS for a transverse electric (TE) mode is not yet suggested. The TDWS suppression technique for the TE mode is essentially required in that silicon photonic devices mainly use a polarized light in the TE mode.

SUMMARY OF THE INVENTION

The present invention provides a waveguide structure capable of suppressing temperature-dependent wavelength shift (TDWS).

The present invention also provides a waveguide structure capable of offsetting TDWS for light of a transverse electric (TE) mode.

Embodiments of the present invention provide waveguide structures including: a slot channel waveguide including first and second patterns, which are spaced apart from each other to define a slot; a first upper layer covering at least a portion of the slot channel waveguide; and a second upper layer covering the remaining portion of the slot channel waveguide. A thermo-optic coefficient (TOC) of the channel waveguide times a TOC of the second upper layer is a negative number.

In some embodiments, the channel waveguide is formed of silicon having a positive TOC, and the second upper layer is formed of a material having a negative TOC.

In other embodiments, a ratio of a contact area between the second upper layer and the channel waveguide with respect to an area of the channel waveguide is selected to offset a wavelength shift of the waveguide structure caused by the TOC of the channel waveguide.

In still other embodiments, the second upper layer includes at least one of polyimide series polymer, polyether series polymer, polymethylmethacrylate (PMMA) series polymer, and acrylate series polymer.

In even other embodiments, the first upper layer is formed of a material having a TOC higher than a material of the second upper layer and lower than a material of the channel waveguide.

In yet other embodiments, the waveguide structures further include a slab waveguide formed below the channel waveguide, a thickness of the slab waveguide being selected to offset a wavelength shift of the waveguide structure caused by the second upper layer.

In further embodiments, the thickness of the slab waveguide ranges from about 1 nm to about 100 nm.

In still further embodiments, a slot width is selected to offset a wavelength shift of the waveguide structure caused by the TOC of the channel waveguide, and a wavelength shift of the waveguide structure caused by the TOC of the second upper layer.

In even further embodiments, the slot width ranges from about 20 nm to about 150 nm.

In yet further embodiments, the first and second patterns are an inner ring resonator and an outer ring resonator defining the slot, a space between the inner and outer ring resonators being selected to offset a wavelength shift of the waveguide structure caused by the TOC of the channel waveguide and a wavelength shift of the waveguide structure caused by the TOC of the second upper layer.

In yet further embodiments, a sum of the widths of the first and second patterns ranges from about 300 nm to about 700 nm.

In yet further embodiments, the waveguide structure includes at least one of a ring resonator wavelength-division-multiplexing (WDM) device, a grating WDM device, an arrayed waveguide grating (AWG) device, and a ring resonator electro-optical device.

In other embodiments of the present invention, waveguide structures include: a slot channel waveguide including first and second patterns, which are spaced apart from each other to define a slot; a slab waveguide formed below the channel waveguide; and an upper layer covering an entire top surface of the channel waveguide. A TOC of the channel waveguide times a TOC of the upper layer is a negative number, and a thickness of the slab waveguide is selected to offset a wavelength shift of the waveguide structure caused by the TOC of the upper layer.

In some embodiments, a thickness of the slab waveguide ranges from about 1 nm to about 100 nm.

In other embodiments, the channel waveguide is formed of silicon having a positive TOC, and the upper layer is formed of a material having a negative TOC.

In still other embodiments, the second upper layer includes at least one of polyimide series polymer, polyether series polymer, PMMA series polymer, and acrylate series polymer.

In even other embodiments, a slot width is selected to offset a wavelength shift of the waveguide structure caused by the TOC of the channel waveguide and a wavelength shift of the waveguide structure caused by the TOC of the upper layer.

In yet other embodiments, the first and second patterns are an inner ring resonator and an outer ring resonator defining the slot, a space between the inner and outer ring resonators being selected to offset a wavelength shift of the waveguide structure caused by the TOC of the channel waveguide and a wavelength shift of the waveguide structure caused by the TOC of the second upper layer.

In further embodiments, a sum of the widths of the first and second patterns ranges from about 300 nm to about 700 nm.

In still further embodiments, the waveguide structure includes at least one of a ring resonator WDM device, a grating WDM device, an AWG device, and a ring resonator electro-optical device.

If a material constituting a core has a high TOC, a temperature change may cause a central wavelength of light progressing through a waveguide to change. The present invention provides a method of accurately suppressing TDWS.

According to one embodiment of the present invention, the TDWS can be suppressed using a cladding having a negative TOC. The TDWS may be excessively offset according to a waveguide structure or a cladding material, such that TDWS may occur unintentionally.

Other embodiments of the present invention provide methods of preventing an unintentional occurrence of TDWS. For example, these methods are implemented by adjusting the thickness of a slab waveguide, a slot width in a channel waveguide, the widths of core patterns constituting a channel waveguide, and a contact area between a cladding material having a negative TOC and a channel waveguide. These methods may be separately applied to suppress the TDWS, but alternatively, at least two methods may be applied together for a reciprocal control.

Because the suggested methods can reduce the TDWS of a waveguide according to a temperature, a stable photonic device can be realized.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIGS. 2A and 2B are a plan view and a sectional view illustrating a waveguide according to one embodiment of the present invention;

FIGS. 4A and 4B are a plan view and a sectional view illustrating a ring resonator according to another embodiment of the present invention;

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, it will also be understood that when a layer (or film) is referred to as being 'on' another layer or substrate, it can be directly on the other layer or substrate, or intervening layers may also be present. In the figures, the dimensions of layers and regions are exaggerated for clarity of illustration. Also, though terms like a first, a second, and a third are used to describe various regions and layers in various embodiments of the present invention, the regions and the layers are not limited to these terms. These terms are used only to tell one region or layer from another region or layer. Therefore, a layer referred to as a first layer in one embodiment can be referred to as a second layer in another embodiment. An embodiment described and exemplified herein includes a complementary embodiment thereof.

Herebelow, a silicon-based slot ring resonator will be used as one example to describe the technical idea of the present invention. However, the technical idea of the present invention may be also applicable to a waveguide structure used for at least one of a ring resonator wavelength-division-multiplexing (WDM) device, a grating WDM device, an arrayed waveguide grating (AWG) device, and a ring resonator electro-optical modulator. The technical idea of the inventive method of offsetting a temperature-dependent wavelength shift (TDWS) using a thermo-optic coefficient (TOC) is not limited to a silicon waveguide. The technique related to the ring resonator electro-optical modulator is disclosed in a thesis by Q. Xu et al. (Q. Xu, S. Manipatruni, B. Schmidt, J. Shakya, and M. Lipson, "12.5 Gbit/s carrier-injection based silicon micro-ring silicon modulators," Opt. Express, vol. 15, pp. 430-436, 2007). The present invention may be applied to the technique disclosed in this thesis.

Figure 1:
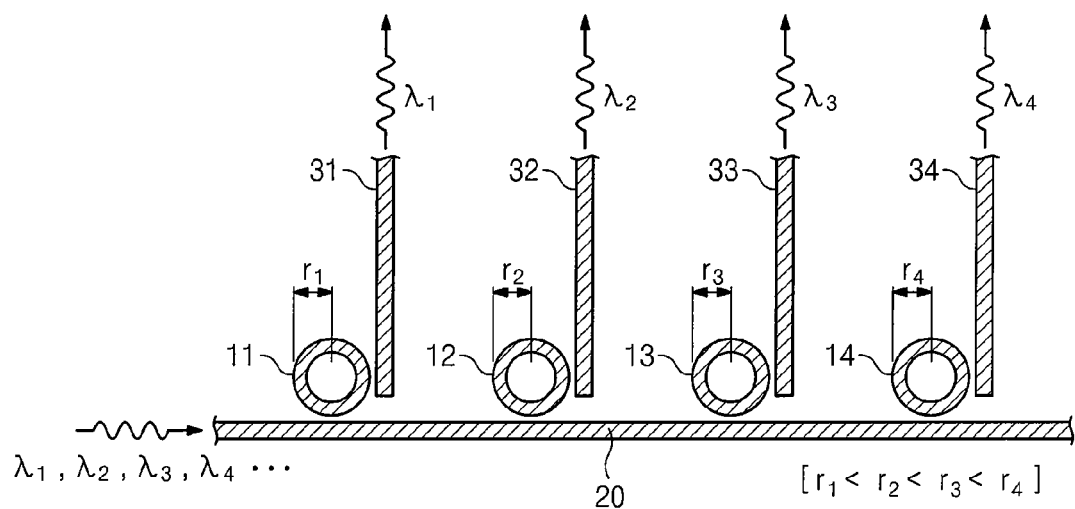
FIG. 1 is a plan view of a typical WDM device including ring resonators.
Figure 2B:
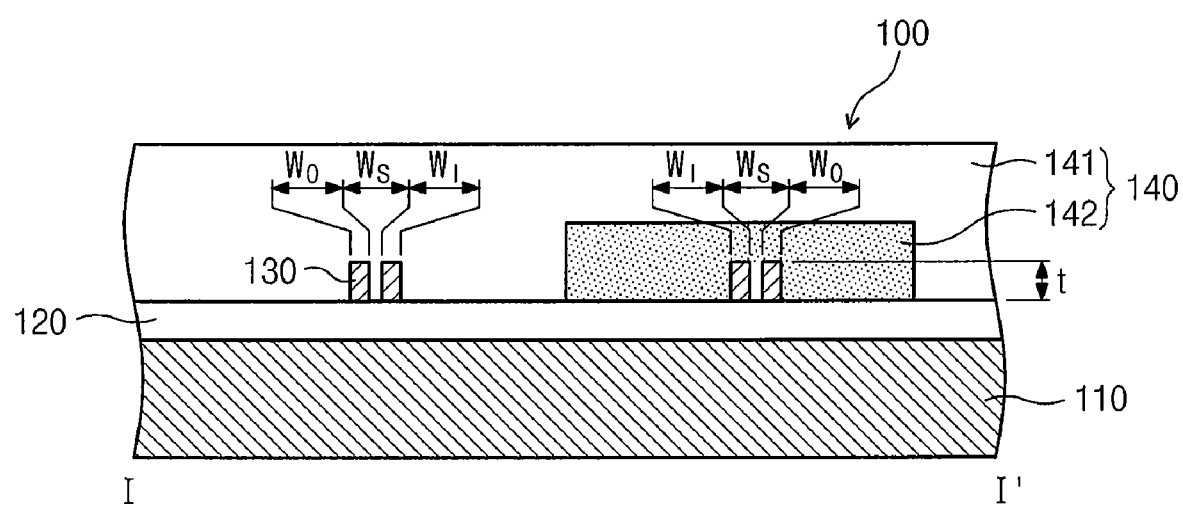

FIGS. 2A and 2B are a plan view and a sectional view illustrating a waveguide according to one embodiment of the present invention. In more detail, FIG. 2B is a section view taken along line I-I' of FIG. 2A.

Referring to FIGS. 2A and 2B, a WDM optical device 100 of the present invention includes silicon patterns 130 on a substrate and an upper layer 140 covering the silicon patterns 130. According to the present invention, the silicon patterns 130 are used as cores of an input waveguide IW, an output waveguide OW, and a ring resonator RR. The upper layer 140 is formed of a material having a lower refractive index than the silicon pattern 130, and is used as a cladding layer of the input waveguide IW, the output waveguide OW and the ring resonator RR. The substrate may include a silicon oxide layer 120 on a silicon wafer 110. The silicon pattern 130, the silicon oxide layer 120, and the silicon wafer 110 may be prepared through a silicon-on-insulator (SOI) technique.

The silicon pattern 130 of the ring resonator RR may constitute a slot waveguide structure, and typically has the thickness t between about 200 nm and about 300 nm. In more detail, the silicon pattern 130 of the ring resonator RR includes an inner ring resonator IRR and at least one outer ring resonator ORR that is disposed outside the inner ring resonator IRR. The inner ring resonator IRR and the outer ring resonator ORR have the common center, but have different radii. Thus, the inner ring resonator IRR and the outer ring resonator ORR are spaced apart from each other to constitute the slot waveguide structure. According to the present invention, the sum of the widths $W_I$ and $W_O$ of the inner ring resonator IRR and the outer ring resonator ORR may range from about 300 nm to about 700 nm. These widths can be used as a parameter to reduce TDWS, and thus the TWDS may vary with the widths.

Additionally, the ring resonator RR is spaced apart from the input waveguide IW and the output waveguide OW. However, because a spaced distance between the input and output waveguides IW and OW and the ring resonator RR determines a resonance frequency for optical coupling phenomenon, light having a resonance frequency corresponding to the spaced distance may be transmitted to the output waveguide OW again after being incident from the input waveguide IW to the ring resonator RR.

The input waveguide IW provides an optical path through which lights with various wavelengths $\lambda_1, \lambda_2, \lambda_3$ and $\lambda_4$ can be transmitted with the minimum energy loss. According to one embodiment, as illustrated in FIG. 2A, the input waveguide IW includes an outer input waveguide OIW disposed around the ring resonator RR and an inner input waveguide IIW disposed between the ring resonator RR and the outer input waveguide OIW. The inner and outer input waveguides IIW and OIW are spaced apart from each other, but light having a resonance frequency corresponding to a spaced distance therebetween may be transmitted from the outer input waveguide OIW to the inner input waveguide IIW through an optical coupling phenomenon. To increase transmission efficiency, both ends of the inner input waveguide IIW may be formed to have a tapered shape as illustrated in FIG. 2A.

The output waveguide OW provides an optical path through which light with a predetermined wavelength, which is incident from the input waveguide IW to the ring resonator RR, is selectively transmitted into another optical device. According to one embodiment, as illustrated in FIG. 2A, the output waveguide OW includes an outer output waveguide OOW disposed around the ring resonator RR and an inner output waveguide IOW disposed between the ring resonator RR and the outer output waveguide OOW. The optical coupling allows light to be transmitted between the inner and outer output waveguides IOW and OOW. Further, like the input waveguide IW, to increase transmission efficiency, the inner output waveguide IOW may have one tapered end as illustrated in FIG. 2A. A tapered region may be formed on one end of the inner output waveguide IOW disposed in a propagation direction of light.

According to this embodiment, the upper layer 140 may include a material of a negative TOC in order to offset the TDWS of silicon. For example, because silicon has a TOC of about $1.8 \times 10^{-4}/°$ C., the TDWS of silicon can be effectively offset when the ring resonator RR is covered with the upper layer 140 made of a material having a TOC of about $-1.8 \times 10^{-4}/°$ C. The material having the TOC of about $-1.8 \times 10^{-4}/°$ C. may include, for example, WIR polymer supplied by Chemoptics Inc.

According to experiments and calculations of inventors, a TDWS offset depends on a slot width $W_S$ between the inner and outer ring resonators IRR and ORR. For example, when the slot width $W_S$ is more than about 90 nm and the ring resonator RR is covered with the upper layer 140 made of a material having a TOC of about $-1.8 \times 10^{-4}/°$ C., the TDWS of the ring resonator RR may have a negative value as illustrated in FIG. 3.

Figure 3:
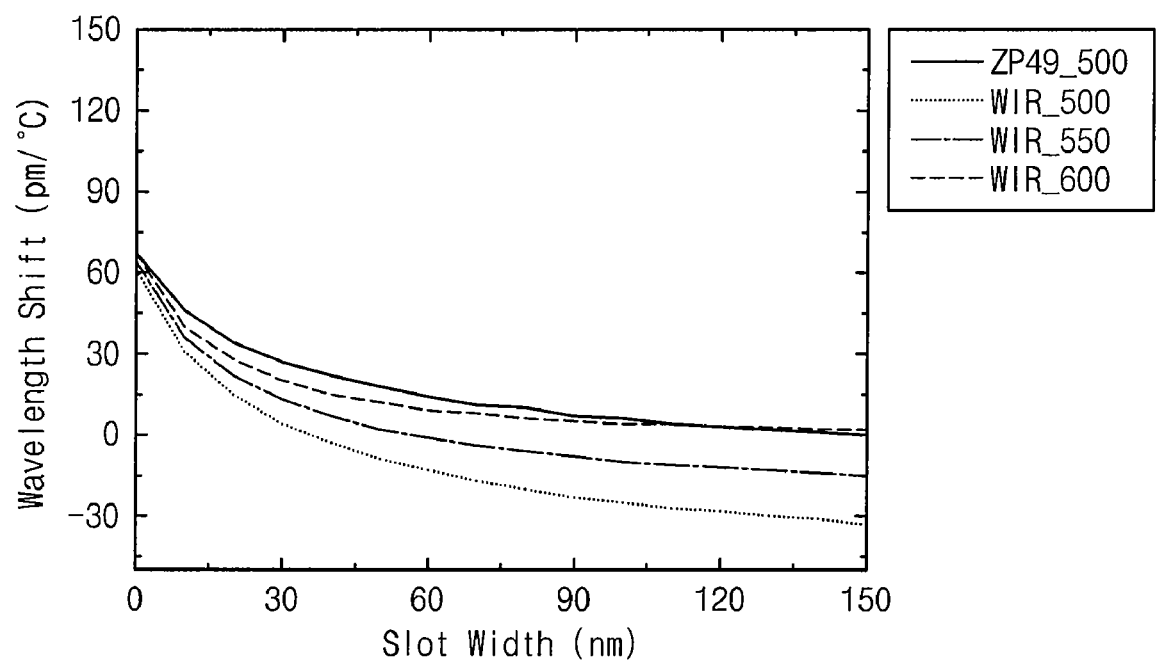
FIG. 3 is a graph illustrating the result of simulating TDWS change according to a slot width.

FIG. 3 is a graph illustrating the result of simulating a TDWS change according to a slot width. It is assumed in this simulation that the upper layer covers the entire surface of the slot ring resonator. Additionally, this simulation is executed under the conditions that WIR polymer and ZP49 polymer are used as the upper layer, respectively. Particularly, in a case where the upper layer is formed of WIR polymer, the simulation is executed under the conditions that the sums ($W_I + W_O$) of the widths of the inner and outer ring resonators IRR and ORR are set to about 500 nm, about 550 nm, and about 600 nm, respectively. In the graph, an x-axis represents the slot width $W_S$ and a y-axis represents the size of a wavelength shift of a ring resonator.

Referring to FIG. 3, as described above, the TDWS of the ring resonator RR is about 100 pm/° C. if there is no upper layer, but the TDWS becomes less than about 100 pm/° C. if there is the upper layer. If the slot (i.e., $W_S=0$) is not formed, the TDWS of the ring resonator RR becomes about 65 pm/° C. regardless of a kind of the upper layer 140 and the widths $W_I$ and $W_O$ of the inner and outer ring resonators IRR and ORR. If, however, the slot is formed between the inner and outer ring resonators IRR and ORR, the TDWS of the ring resonator RR decreases as the slot width $W_S$ increases. Herein, a decreasing rate varies according to a kind of the upper layer 140 and the widths of the inner and outer ring resonators IRR and ORR. According to the graph, in a case where WIR polymer is used for the upper layer 140 and the sum ($W_I + W_O$) of the widths of the inner and outer ring resonators IRR and ORR is about 500 nm, the TDWS of the ring resonator RR is about 0 when the slot width $W_S$ is about 30 nm. However, when the slot width $W_S$ is more than about 30 nm, the TDWS has a negative value.

According to another embodiment of the present invention, there is provided a method of offsetting TDWS when the slot width $W_S$ is more than about 30 nm. Specifically, according these embodiments, the upper layer 140 includes a first upper layer 141 and a second upper layer 142, which are formed of materials having different TOCs. In this case, as illustrated in FIGS. 2A and 2B, a portion of the surface of the ring resonator RR may be covered with the first upper layer 141 and the remaining surface may be covered with the second upper layer 142. For example, the first upper layer 141 may be formed of a material having a positive TOC, and the second upper layer 142 may be formed of a material having a negative TOC. Alternatively, the first and second upper layers may be formed of materials having different negative TOCs. The material having a positive TOC may be a silicon oxide layer (TOC=$1.0 \times 10^{-5}/°$ C.), and the material having a negative TOC may be polyether series ZP49 polymer (TOC=$-1.0 \times 10^{-4}/°$ C.) or acrylate series polymer (e.g., WIR polymer of Chemoptics Inc.). The above-described materials are exemplarily provided to illustrate a method of realizing the technical idea of the present invention, and thus the prevent invention is not limited thereto.

According to the present invention, a contact area between the first and second upper layers 141 and 142 and the ring resonator RR may vary. A ratio between these contact areas can be determined in consideration of a change in TDWS with the slot width $W_S$ as illustrated in FIG. 3, or can be changed according to a structure of the ring resonator RR (e.g., the radius of a ring, the widths $W_I$ and $W_O$ of the inner and outer ring resonators IRR and ORR, and the slot width $W_S$). Furthermore, at least one of the first and second upper layers 141 and 142 may be divided into several parts to cover the surface of the ring resonator RR.

Figure 4B:
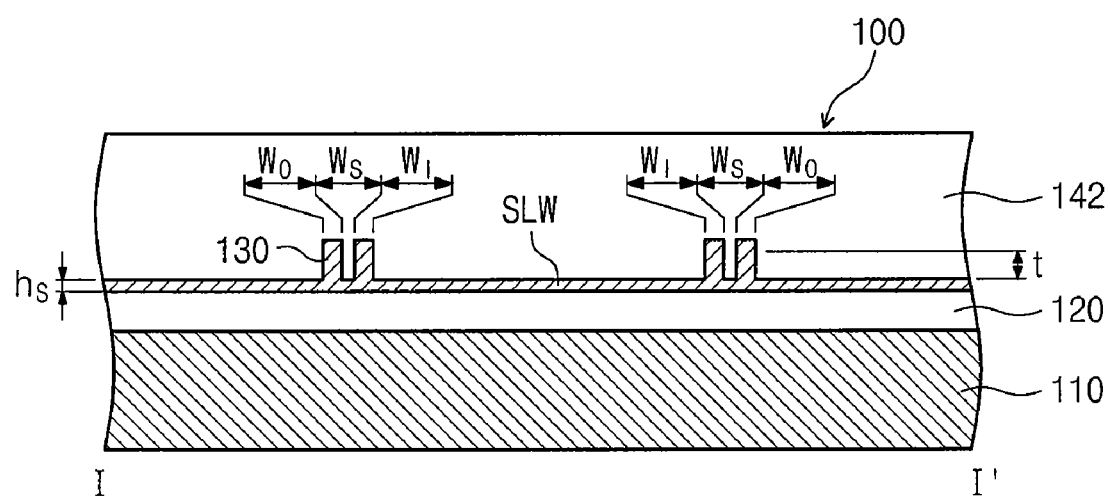

FIGS. 4A and 4B are a plan view and a sectional view illustrating a ring resonator according to another embodiment of the present invention. This embodiment is similar to the foregoing embodiments except that the thickness of a slab waveguide is changed to reduce TDWS of a ring resonator. Accordingly, its overlapping description will be omitted for conciseness.

Referring to FIGS. 4A and 4B, according to this embodiment, a slab waveguide SLW is formed below the silicon pattern 130, and the silicon patterns 130 are covered with the upper layer 140. An occupation area of the slab waveguide SLW should be wider than those of the ring resonator RR and the input and output waveguides IW and OW. The slab waveguide SLW may be formed of the same material as the silicon pattern 130.

Figure 5:
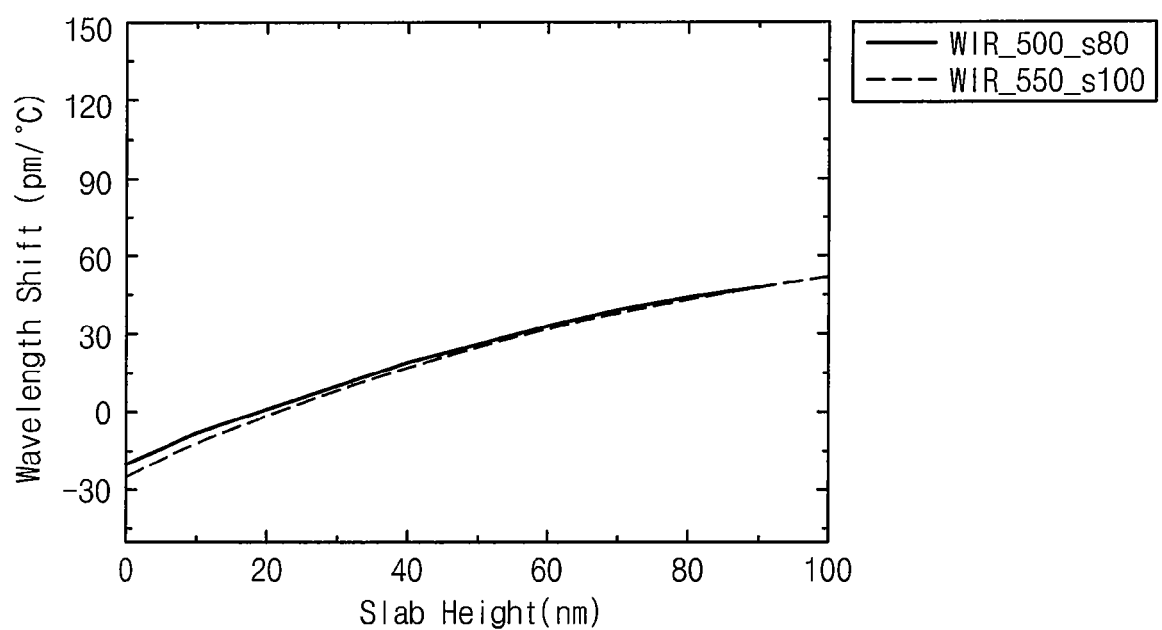
FIG. 5 is a graph illustrating the result of simulating TDWS change according to the thickness of a slab waveguide in a slot ring resonator.

According to calculations of inventors, the TDWS of such a waveguide structure is dependent on the thickness $h_s$ of the slab waveguide SLW. More specifically, FIG. 5 is a graph illustrating the result of simulating TDWS change according to the thickness $h_s$ of the slab waveguide SLW in the slot ring resonator of FIGS. 4A and 4B. In the graph, an x-axis represents the thickness $h_s$ of a slab waveguide SLW, and a y-axis represents a wavelength shift. A reference wavelength of this simulation is about 1550 nm.

Referring to FIG. 5, as the thickness $h_s$ of the slab waveguide SLW increases, the wavelength shift of light increases. Consequently, the thickness $h_s$ of the slab waveguide SLW may be used as a control parameter to offset an excessive change of the TDWS caused by the upper layer 140.

For this reason, in the embodiment of the present invention of FIGS. 4A and 4B, the slab waveguide SLW has the thickness $h_s$ to offset TDWS caused by a TOC of the silicon pattern 130 and TDWS caused by a negative TOC of the upper layer 140. For example, the thickness $h_s$ of the slab waveguide SLW may range from about 1 nm to about 100 nm to satisfy the above technical requirements.

To prevent excessive TDWS change that may occur when the upper layer 140 covers an entire surface of the silicon pattern 130, the upper layer 140 is formed to cover a portion of the silicon pattern 130, as illustrated in the previous embodiment of FIGS. 2A and 2B. Unlike this, according to this embodiment, it is possible to offset the TDWS of a waveguide because the TDWS increases due to the thickness $h_s$ of the slab waveguide SLW even when the upper layer 142 having a negative TOC covers an entire surface of the silicon pattern 130.

FIGS. 6A through 6D are graphs illustrating optical properties of actual ring resonators. These graphs are achieved by measuring samples in which the upper layer covers the entire top surface of the ring resonator. In the graphs, an x-axis represents a wavelength and a y-axis represents light transmittance. In the graphs, reference numerals 25, 35, 45, 55 and 65 denote that experimental results are respectively measured at a temperature of 25° C., 35° C., 45° C., 55° C. and 65° C. In the graphs, symbols T and D denote that experimental results are measured at a through port and a drop port of a ring resonator, respectively.

Figure 6A:
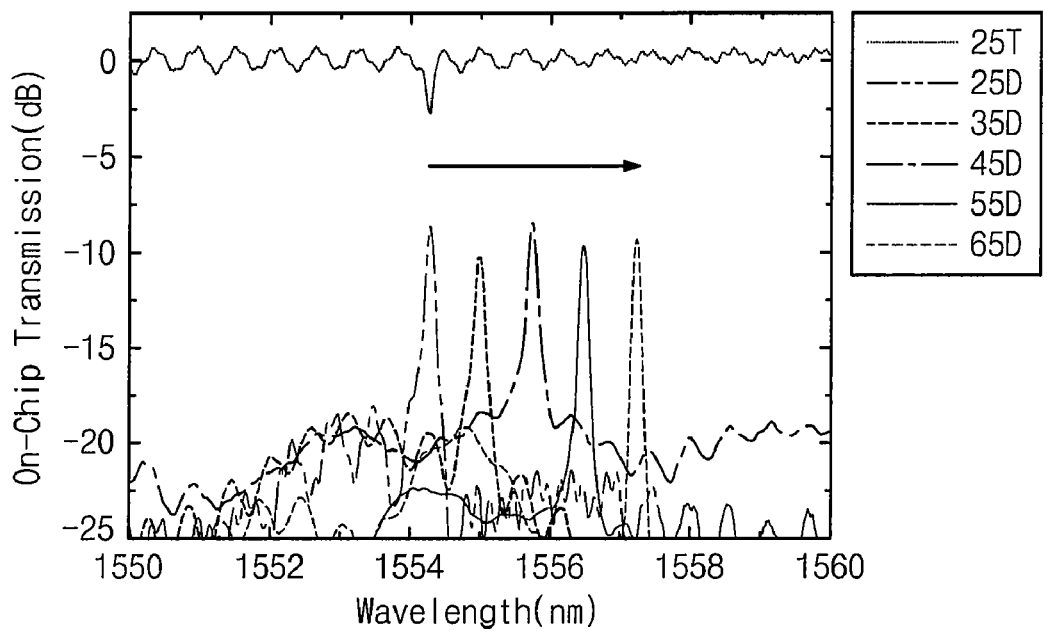
FIGS. 6A through 6D are graphs illustrating optical properties of actual ring resonators.

FIG. 6A is a graph illustrating the measurement result when there is no slot ($W_S=0$). Accordingly, this graph illustrates characteristics of a typical ring resonator. As a temperature increases from 25° C. to 65° C., the position of a resonance wavelength shifts from about 1554 nm to about 1557 nm.

Figure 6B:
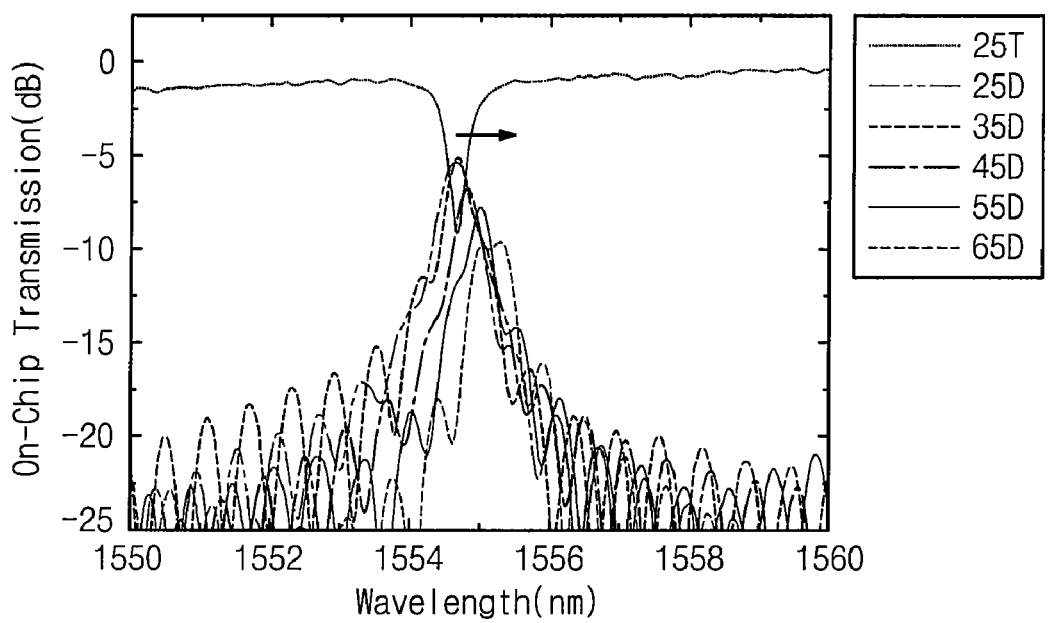

FIG. 6B is a graph illustrating the measurement result when a slot width $W_S$ is 120 nm and the upper layer is formed of ZP49 polymer. As a temperature increases, the position of a resonance wavelength shifts toward the right of the graph, but its shift is relatively small compared to the result of FIG. 6A.

Figure 6C:
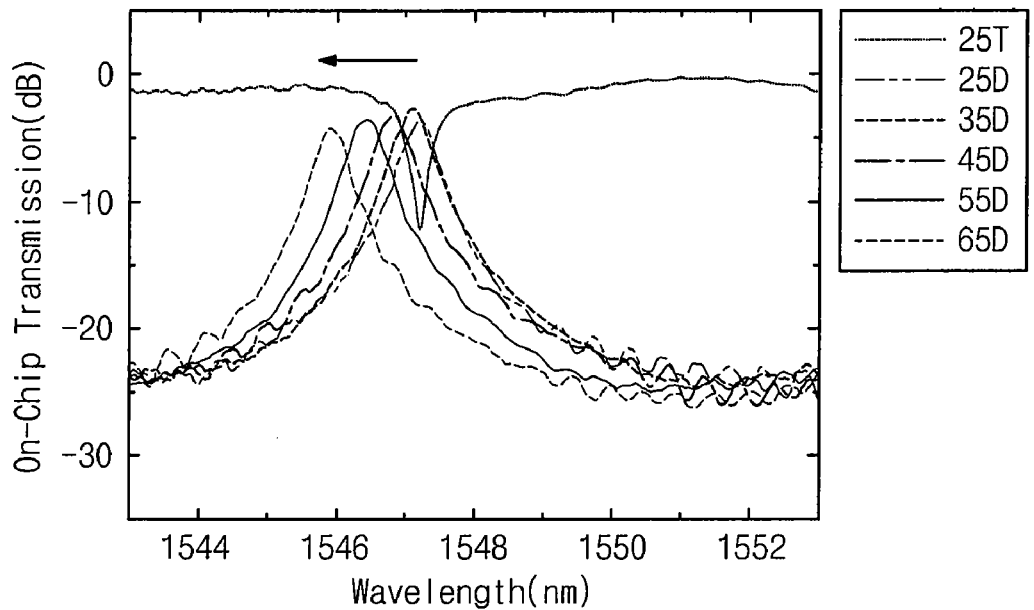

FIG. 6C is a graph illustrating the measurement result when a slot width $W_S$ is 110 nm and the upper layer is formed of WIR polymer. As a temperature increases, the position of a resonance wavelength shifts toward the left of the graph, which is contrary to the results of FIGS. 6A and 6B.

Figure 6D:
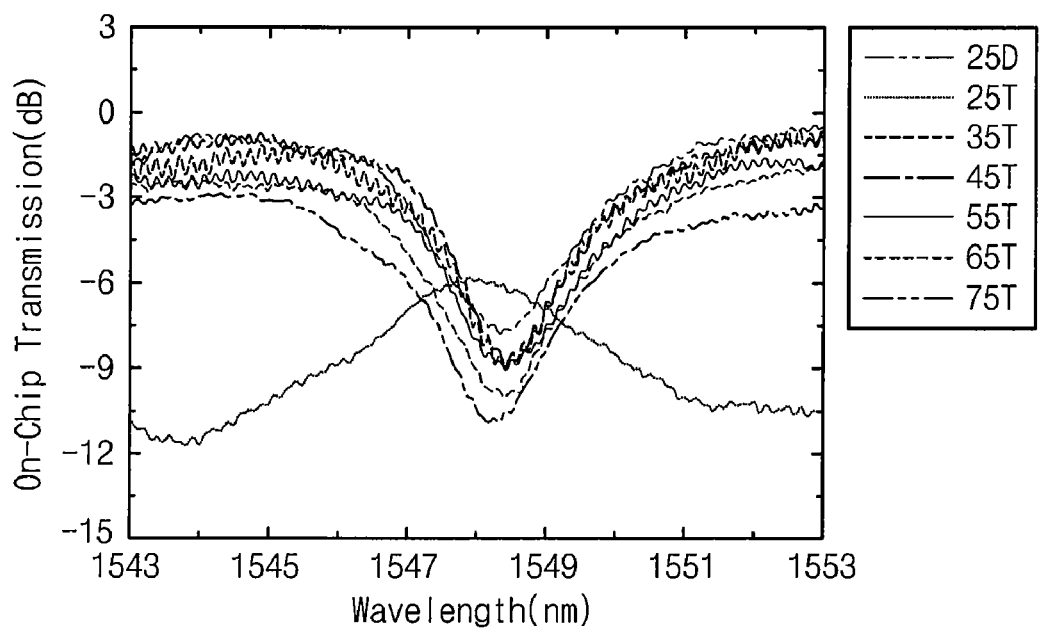

FIG. 6D is a graph illustrating the measurement result when a slot width $W_S$ is 90 nm and the upper layer is formed of WIR polymer. This experimental result shows that the position of a resonance wavelength is irrelevant to a temperature.

Figure 7:
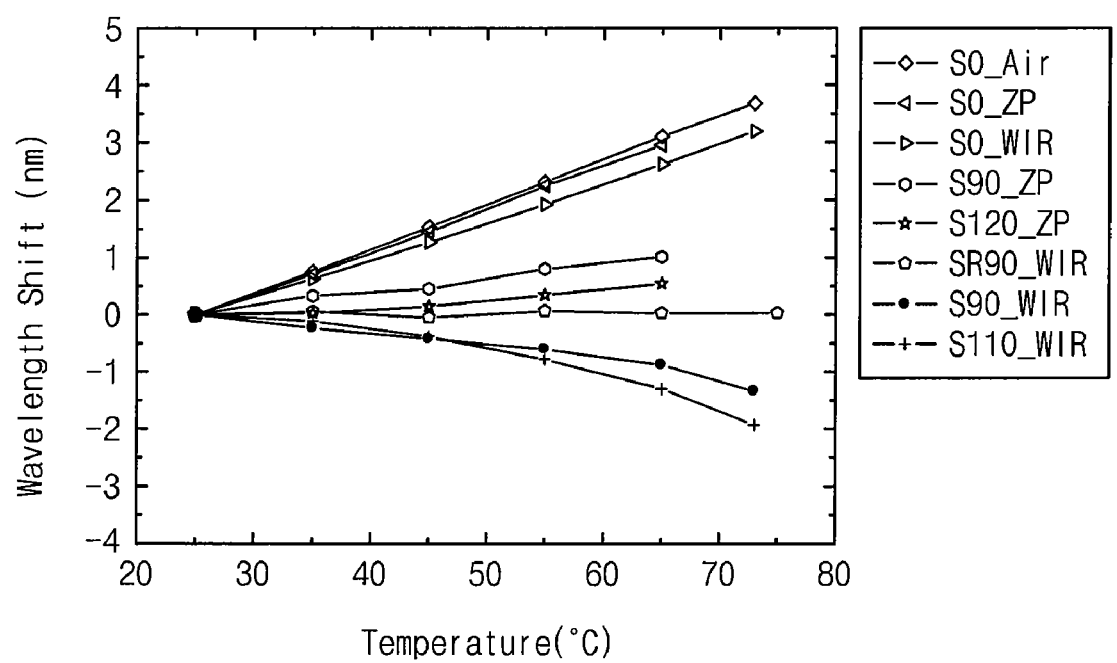
FIG. 7 is a graph illustrating a measurement of a resonance wavelength change of an actual ring resonator.

FIG. 7 is a graph illustrating a measurement of a resonance wavelength change of an actual ring resonator. In FIG. 7, symbols S0, S90, S110, and S120 denote that experimental results are measured when a slot width is set to 0 nm, 90 nm, 110 nm, and 120 nm, respectively. Further, symbols Air, ZP, and WIR denote experimental results are measured when an air cladding, a ZP49 polymer cladding, and a WIR polymer cladding are used as the upper layer, respectively. The symbol SR90 denotes the result obtained by measuring a sample having a slab waveguide illustrated in FIG. 4B.

Referring to FIG. 7, like the aforesaid experimental results, if there is no slot, a resonance wavelength shift increases greatly as a temperature increases regardless of a kind of the upper layer (see the curves SO_Air, SO_ZP, and SO_WIR). In a case of the ZP49 polymer cladding, a gradient of a wavelength shift with respect to a temperature is relatively smaller, but the resonance wavelength shift still increases as a temperature increases (see the curves S90_ZP and S120_ZP). In a case of the WIR polymer cladding, however, a resonance wavelength shift is drastically decreased to have a negative value as a temperature increases (see the curves S90_WIR and S110_WIR). On the contrary, in a case where there is a slab waveguide, the slot width is about 90 nm, and the WIR polymer cladding is used as the upper layer, the resonance wavelength shift does not take place substantially.

The foregoing was a description for methods of suppressing TDWS by adjusting the thickness $h_s$ of the slab waveguide, the slot width $W_S$ at the channel waveguide, the widths $W_I$ and $W_O$ of core patterns constituting a channel waveguide, and the contact area between a cladding material having a negative TOC and a channel waveguide. These methods may be separately applied to suppress the TDWS, and alternatively, at least two methods may be applied together for a control of TDWS.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A waveguide structure comprising:
a slot channel waveguide including first and second patterns, which are spaced apart from each other to define a slot;
a first upper layer covering at least a portion of the slot channel waveguide;
a second upper layer covering the remaining portion of the slot channel waveguide; and
a slab waveguide formed below the channel waveguide, a thickness of the slab waveguide being selected to offset a wavelength shift of the waveguide structure caused by the second upper layer,
wherein a thermo-optic coefficient (TOC) of the channel waveguide times a TOC of the second upper layer is a negative number.

2. The waveguide structure of claim 1, wherein the channel waveguide is formed of silicon having a positive TOC, and the second upper layer is formed of a material having a negative TOC.

3. The waveguide structure of claim 2, wherein a ratio of a contact area between the second upper layer and the channel waveguide to an area of the channel waveguide is selected to offset a wavelength shift of the waveguide structure caused by the TOC of the channel waveguide.

4. The waveguide structure of claim 2, wherein the second upper layer comprises polyimide series polymer, polyether series polymer, polymethylmethacrylate (PMMA) series polymer, or acrylate series polymer.

5. The waveguide structure of claim 1, wherein the first upper layer is formed of a material having a TOC higher than a material of the second upper layer and lower than a material of the channel waveguide.

6. The waveguide structure of claim 1, wherein the thickness of the slab waveguide ranges from 1 nm to 100 nm.

7. The waveguide structure of claim 1, wherein a slot width is selected to offset a wavelength shift of the waveguide structure caused by the TOC of the channel waveguide and a wavelength shift of the waveguide structure caused by the TOC of the second upper layer.

8. The waveguide structure of claim 1, wherein the slot width ranges from 20 nm to 150 nm.

9. The waveguide structure of claim 1, wherein the first and second patterns are an inner ring resonator and an outer ring resonator defining the slot,
a space between the inner and outer ring resonators being selected to offset a wavelength shift of the waveguide structure caused by the TOC of the channel waveguide and a wavelength shift of the waveguide structure caused by the TOC of the second upper layer.

10. The waveguide structure of claim 9, wherein a sum of the widths of the first and second patterns ranges from 300 nm to 700 nm.

11. The waveguide structure of claim 1, wherein the waveguide structure comprises at least one of a ring resonator wavelength-division-multiplexing (WDM) device, a grating WDM device, an arrayed waveguide grating (AWG) device, and a ring resonator electro-optical device.

12. A waveguide structure comprising:
a slot channel waveguide including first and second patterns, which are spaced apart from each other to define a slot;
a slab waveguide formed below the channel waveguide; and
an upper layer covering an entire top surface of the channel waveguide,
wherein a TOC of the channel waveguide times a TOC of the upper layer is a negative number, and
a thickness of the slab waveguide is selected to offset a wavelength shift of the waveguide structure caused by the TOC of the upper layer.

13. The waveguide structure of claim 12, wherein a thickness of the slab waveguide ranges from 1 nm to 100 nm.

14. The waveguide structure of claim 12, wherein the channel waveguide is formed of silicon having a positive TOC, and the upper layer is formed of a material having a negative TOC.

15. The waveguide structure of claim 14, wherein the upper layer comprises polyimide series polymer, polyether series polymer, PMMA series polymer, or acrylate series polymer.

16. The waveguide structure of claim 12, wherein a slot width is selected to offset a wavelength shift of the waveguide structure caused by the TOC of the channel waveguide and a wavelength shift of the waveguide structure caused by the TOC of the upper layer.

17. The waveguide structure of claim 12, wherein the first and second patterns are an inner ring resonator and an outer ring resonator defining the slot,
a space between the inner and outer ring resonators being selected to offset a wavelength shift of the waveguide structure caused by the TOC of the channel waveguide and a wavelength shift of the waveguide structure caused by the TOC of the upper layer.

18. The waveguide structure of claim 12, wherein a sum of the widths of the first and second patterns ranges from 300 nm to 700 nm.

19. The waveguide structure of claim 18, wherein the waveguide structure comprises at least one of a ring resonator WDM device, a grating WDM device, an AWG device, and a ring resonator electro-optical device.

20. A waveguide structure comprising:
a slot channel waveguide including first and second patterns spaced apart from each other to define a slot, the first and second patterns provided over a substrate;
a first upper layer provided over a first portion of the slot channel waveguide and provided at an opposing side of the substrate with respect to the first and second patterns; and
a second upper layer provided over a second portion of the slot channel waveguide and provided at the opposing side of the substrate with respect to the first and second patterns, the first and second portions being different,
wherein a thermo-optic coefficient (TOC) of the channel waveguide times a TOC, of the second upper layer is a negative number,
wherein the channel waveguide is formed of silicon having a positive TOC, and the second upper layer is formed of a material having a negative TOC, and
wherein a ratio of a contact area between the second upper layer and the channel waveguide to an area of channel waveguide is selected to offset a wavelength shift of the waveguide structure caused by the TOC of the channel waveguide.

* * * * *